United States Patent Office 3,350,473
Patented Oct. 31, 1967

3,350,473
PROCESS FOR THE DEPURATION OF ACETYLENE CONTAINED IN THE GASES OBTAINED BY CRACKING OF HYDROCARBONS
Virgilio Stocchi, Mestre, Aldo Ferin, Veneto, and Augusto Magelli, Mestre, Italy, assignors to Montecatini Edison S.p.A., Milan, Italy
No Drawing. Filed Dec. 16, 1964, Ser. No. 418,886
Claims priority, application Italy, Dec. 19, 1963, 26,012/63
5 Claims. (Cl. 260—679)

ABSTRACT OF THE DISCLOSURE

Process for the recovery of pure acetylene contained in crude acetylene-containing gas obtained from the cracking of hydrocarbons, and having 5 to 15% by volume acetylene which consists in washing the crude gas with sulphuric acid having a concentration between 70 and 98%, at a temperature between 25 and 40° C. under a pressure such that the partial pressure of the acetylene is between 0.5 and 1.4 atm., the sulphuric acid, which comes from the washing of the gas under pressure, being used for prewashing the crude gas at a substantially atmospheric pressure and a temperature of 25 to 40° C.

---

The present invention relates to a process for the depuration of acetylene contained in crude gases obtained from the cracking of methane and of other gaseous or liquid or liquified hydrocarbons.

It is well known that the crude gases thus obtained contain, depending on the type and nature of the cracking process or on the nature of the hydrocarbons treated, besides acetylene in quantities generally comprised between 5 and 15% by volume, varying quantities of hydrogen, carbon monoxide, carbon dioxide, methane, small quantities of aromatic hydrocarbons such as benzene, naphthalene, acenapthalene and other unsaturated compounds among which are olefins such as ethylene, allene, butenes, 1,3-butadiene, propene and homologues of acetylene such as vinylacetylene, diacetylene, triacetylene, etc.

The acetylene is in fact diluted and contaminated by those various compounds from which it must be separated in an economical way and with high yields to give a pure state if it is to be employed in the chemical processes which require it.

Particularly troublesome are the homologues of acetylene, which are difficult to separate from acetylene itself and give rise to polymers having the tendency to form deposits and foul the interior of the apparatus and often are even dangerous because of their explosiveness.

The following methods have been suggested for separating and depurating acetylene from raw gases and have proved to be a particular industrial interest:

(1) Concentration of the acetylene by the treatment of the compressed raw gases with suitable selective solvents, wherein all the acetylene is substantially dissolved together with the higher acetylene and other apparatus-fouling impurities while the nonsoluble components escape, and subsequent degasifying recovery of acetylene from the solvent by dropping the pressure and/or increasing the temperature. This stage of concentration may be preceded by a preliminary washing at normal pressure with the same or another solvent in order to eliminate right away part of the impurities contained in the gas.

(2) Subsequent purification of the concentrated acetylene thus obtained (having a concentration generally comprised between 98% and 99% in volume) and which carries with it various impurities that cannot be completely removed by degasing. Such a purification may, for instance, be carried out by means of washing at substantially atmospheric pressure with sulphuric acid having a concentration varying from 60% to 98%, depending on the temperature.

These processes, however, are not fully satisfactory in as much as there is a considerable fouling of the concentration solvent due to the presence of higher acetylenes which accompany the acetylene and which, in solution by the concentration solvent, have a tendency to polymerize partially giving use to polymers which are dispersed in the solvent as colloids tending to flocculate under certain operational conditions, thereby forming deposits and blockages in various parts of the plant, particularly in apparatus working under heat (evaporators, heat exchangers, pipes, etc.).

As a consequence, there is a considerable pressure drop in the fluid-flow parts, it becomes impossible to exploit the plant at its maximum output capacity, there are frequent burdensome stoppages of the plant for the periodically necessary cleaning operations with serious limitations as to the capacity of the plant. The plant also requires continuous regeneration operations on the circulating solvent with all the drawbacks such as expensiveness of the operations, loss of solvent and dangerousness, due to the explosiveness of the higher acetylenes and of their polymers.

Thus, the main object of the present invention is that to provide a process for the separation and purification of the acetylene contained in the gases obtained by the cracking of hydrocarbons in order to prevent the above mentioned inconveniences.

Another object of this invention is that of providing a process suitable for hindering the formation of deposits and scale from precipitation of the polymers of the higher acetylenes in apparatus of plants for the depuration and concentration of acetylene with selective solvents.

Now, according to this invention, it has been found that the acetylene contained in petroleum-cracking gases may be economically purified of its impurities by washing of the crude gases, containing acetylene in the amount of 5% to 15% (by volume), with sulphuric acid having a concentration of 70 to 98% at a temperature of from 25 to 40° C. and at a pressure such that the partial pressure of the acetylene be comprised between 0.5 and 1.4 atm. Preferably, however, we operate according to this invention, at a partial pressure of the acetylene comprised between 0.8 to 1.2 atm., that is, corresponding to a total absolute pressure of 5–24 atm.

The acetylene thus purified is then conveyed to the concentration stage in which are used the usual selective solvents. While the above-mentioned upper limit of the partial pressure of the acetylene (1.4 atm.) is solely dictated by safety reasons, the lower limit (0.5 atm.) is a practical limit imposed by the losses of the acetylene, losses that at partial pressure below said limit tend to increase considerably.

In accordance with this invention, practically all the impurities contained in the crude gas, and which are the cause of the formation of polymers in the solvents and therefore the formation of deposits and scale, are eliminated before the introduction of the crude gas into the concentration stage. This means that the concentration process is actually carried out on a pre-purified gas; consequently there is considerable advantage from the saving of solvent, on the one hand, because the losses of solvent combined with polymer are reduced and secondly there is a reduction of the quantity of solvent that enters the regeneration apparatus, with a consequent reduction of the corresponding losses.

The degree of purification is very high while the losses in acetylene are practically equal to those obtained in the earlier processes of purification with $H_2SO_4$ of acetylene preliminarily concentrated (operating at substantially atmospheric pressure), that is of the order of from 0.2–0.3% (by weight), and are definitely lower than those obtained in the purification of crude gases from cracking which operate at substantially atmospheric pressure and show losses of the order of 2% in weight.

In the purification process described herein above one can dispose of considerable quantities of $H_2SO_4$ at a titer of 70–90% which comes from the washing under pressure, and which may be recycled to a recovery stage (for instance for producing fertilizers) or may be concentrated and re-used for subsequent operations.

Preferably the above mentioned acid is actually used for carrying out a pre-washing of the crude gas before the compression phase so as to eliminate the hydrocarbons that are susceptible to solidification, particularly naphthalene and acenaphthalene which, upon condensing, would clog the downstream equipment (such as refrigerators, compressors, etc.).

The discharged acid coming from this pre-washing operation and having a concentration generally comprised between 40 and 70%, is conveyed to the recovery stage, using it either just as it is (for producing fertilizers, viz. ammonia sulphate) or burning it in order to produce $SO_2$.

According to this embodiment of the process of purification, this latter consists thus of two parts, one being carried out substantially at atmospheric pressure and one operating under pressure.

In the low-pressure stage the crude gas containing from 5–15% (by volume) of acetylene is subjected to washing at a substantially atmospheric pressure at 25–40° C., in one or more columns either of the plate or packed, single or multi-stage type, with sulphuric acid having a concentration of 40%–90%; at the input, the acid coming from the subsequent purification treatment under pressure has a titer of from 70–90%, while at the output it lies between 40 and 70%.

In order to avoid the formation of foam suitable known defoamers such as phenols, may be added.

The gas thus freed of the naphthalene and of the other easily condensable hydrocarbons, after a preliminary neutralization (by alkaline washing) of the droplets of sulphuric acid entrained in the gas, is compressed to reach a maximum partial pressure of the acetylene of 1.4 atm.

The gas thus compressed is then treated at a temperature comprised between 25 and 40° C. with $H_2SO_4$ having a concentration between 70 and 98% (at input 90–98%, at output 70–90%) and then, after further alkaline washing, the gas is concentrated by treating it with the usual known selective solvents.

The sulphuric acid coming from the treatment under pressure and which has a titre of between 70 and 90%, is re-cycled to the pre-washing stage at atmospheric pressure. The sulphuric acid discharged by this latter phase and which shows a titre comprised between 40 and 70%, and which contains all the impurities eliminated during the two treatments, is sent, as already mentioned, to the recovery stage.

According to this embodiment of the process, therefore, it is possible to achieve the advantage of directly and economically eliminating from the system with the aid of the exhausted and discharged $H_2SO_4$ all the impurities absorbed during the purification, thereby avoiding all the difficult and expensive operations of separating the washing liquid from the impurities, and to prevent the re-cycling, together with the purified washing liquid of part of the impurities that unavoidably remain in it.

According to a preferred embodiment of this invention, it has been found to be particularly convenient to subject the gas, coming from the sulphuric washing under pressure, to an alkaline washing before absorption in the selective solvent.

The alkaline treatment of the gases which, after the sulphuric-acid washing under pressure, proceed to the absorption stage for contact with the selective solvent, has turned out indeed to be useful for the neutralization of the entrained drops of sulphuric acid, and for hindering the formation of deposits and scale inside the apparatus.

As a matter of fact, be it because the removal of the higher acetylenes through the sulphuric-acid washing under pressure, even if very rigorous, can never be wholly quantitative, or be it because under particular and casual operating conditions of the plant a part of the higher acetylene may escape in greater percentages than normal, a certain formation of polymers inside the solvent is often inevitable, with a consequent, even if at a decidedly reduced degree, formation of fouling deposits, particularly in apparatus operating at elevated temperatures.

It has now been found surprisingly that carrying out an alkaline washing of the gases coming from the reduced pressure sulphuric-acid washing, for instance a washing in plate or packed columns with dilute solutions of alkaline or ammonium hydroxides or carbonates, of organic bases, etc., the polymer eventually forming inside the concentration solvent, for instance owing to casual insufficiency or lack of the sulphuric washing, remain dispersed in a stable manner in the form of colloid in the solvent itself without giving rise to flocculation or deposition even in the apparatus working under heat.

The combination of the step of washing the crude gases with concentrated sulphuric acid under pressure with the step of alkaline washing permits the operations for the separation of the acetylene from the gases contained in the former and to regenerate the solvent to be carried out with the maximum of safety and at minimum cost.

It is, thus possible to operate at the maximum operational efficiency of the plant for very long stretches of time without stoppages for maintenance operations.

Further features and advantages of this invention will be illustrated by the following examples:

Example 1

4000 m.³/h. (S.T.P.) of gas from the cracking of methane saturated with vapor at 35° C. and at a pressure of 782 mm. Hg and containing the impurities recorded in Table 1 under column 1, is compressed to 10 atm. and then washed in a depuration column with 140 kg./h. of $H_2SO_4$ at 98% titer.

The temperature in the top of the column is about 35° C. The sulphuric acid is then discharged at a concentration of 75.3%.

At the output of the column the purified gas contains the impurities recorded under column 2.

TABLE 1

| Impurities | 1 | 2 |
|---|---|---|
| Propylene | 0.006 | 0.001 |
| Allene | 0.030 | 0.012 |
| Propyne | 0.061 | 0.004 |
| 1,3-butadiene | 0.004 | 0 |
| Vinylacetylene | 0.022 | 0.002 |
| Diacetylene | 0.200 | 0.160 |
| Benzene | 0.078 | 0.050 |
| Triacetylene | 0.006 | 0 |

*Example 2*

4000 m.³/h. (S.T.P.) of gas obtained from the cracking of methane at 25° C. and 782 mm. Hg and containing 8.7% by volume of acetylene and the impurities recorded in Table 2 under column 1, are fed into a packed column where they are washed with sulphuric acid coming from the subsequent depuration stage under pressure, and which enters at a concentration of 74.7% and is then discharged from the tower at 42%.

The gas comes out of this washing stage with the impurities recorded in column 2 of Table 2.

The gas, after neutralization with a sodium carbonate solution in a packed column, is compressed to 10 atm. and then conveyed to the depuration tower fed with 110 kg. of $H_2SO_4$ at 98% titer. The temperature in the top of the tower is about 25° C. At the outlet of the tower the purified gas shows the composition recorded in column 3 of Table 2. The discharged sulphuric acid, having a titration equal to 74.7%, is then conveyed to the first column for the pre-washing.

TABLE 2

| Impurities | 1 | 2 | 3 |
|---|---|---|---|
| Propylene | 0.006 | 0.006 | 0.001 |
| Allene | 0.032 | 0.032 | 0.012 |
| Propyne | 0.065 | 0.065 | 0.004 |
| 1,3-butadiene | 0.003 | 0.003 | 0 |
| Vinylacetylene | 0.023 | 0.023 | 0.002 |
| Diacetylene | 0.106 | 0.106 | 0.073 |
| Benzene | 0.099 | 0.099 | 0.073 |
| Naphthalene | 0.003 | Traces | 0 |
| Triacetylene | 0.005 | 0.005 | 0 |
| Acenaphthalene | 0.001 | 0 | 0 |

*Example 3*

4000 m.³/h. (S.T.P.) of gas obtained from the cracking of methane at 35° C. and 782 mm. Hg and containing 8.7% by volume of acetylene and the impurities recorded in Table 3, column 1, are fed into a three-stage filled-type column where the gas is washed with sulphuric acid coming from the subsequent depuration stage, and which enters the column from above into the first stage at a concentration of 80.2% and is discharged from the lower stage at 44.5% concentration.

The gas which, after the washing is discharged, has all the impurities recorded in column 2 of Table 3.

The pre-depurated gas is then neutralized with an aqueous solution of sodium carbonate at 8% concentration in a packed column and is then compressed in the compressor to 10 atm. and is conveyed to a depuration column which is fed with 192 kg./h. of sulphuric acid at 98% titer.

The temperature in the top of the depuration tower is about 35° C. The sulphuric acid discharged, having a titer of 80.2%, is then conveyed to the three-stage column for the pre-washing. At the output of the column the depurated gas shows the composition recorded in column 3 of Table 3.

The loss in acetylene turned out to be less than 0.5%.

TABLE 3

| Impurities | 1 | 2 | 3 |
|---|---|---|---|
| Percent in volume: | | | |
| Propylene | 0.006 | 0.006 | 0.001 |
| Allene | 0.030 | 0.030 | 0.011 |
| Propyne | 0.061 | 0.061 | 0.004 |
| 1,3-butadiene | 0.004 | 0.004 | 0 |
| Vinylacetylene | 0.022 | 0.022 | 0.002 |
| Diacetylene | 0.200 | 0.200 | 0.150 |
| Benzene | 0.078 | 0.078 | 0.048 |
| Naphthalene | 0.0035 | 0 | 0 |
| Triacetylene | 0.006 | 0.006 | 0 |
| Acenaphthalene | 0.001 | 0 | 0 |

By subjecting the depurated gas to a washing in a filled-type column with an 8% NaOH solution before its treatment with a concentration solvent, it is noted that, although the residue of the higher acetylenes are not further eliminated, they do not produce in the concentration solvent flocculation of the polymers.

*Example 4*

A gas obtained by the cracking of methane saturated with water vapor at 35° C. and 782 mm. Hg and containing the impurities recorded on the Table 1 under column 1, is compressed to 10 atm. and then washed in a purification column with $H_2SO_4$ at 98% titer.

The temperature at the top of the column is about 35° C. The sulphuric acid is discharged at a concentration of 75.3%. At the outlet of the column the purified gas contains the impurities recorded under column 2 of the table.

The gas is then conveyed, without alkaline treatment, directly to the concentration plant where it is concentrated through absorption on N-methylpyrolidone.

After a 10-day production run a sample of the recycling solvent before its entry into the absorption column is withdrawn and analysed by means of colorimetric comparison with a standard sample of a conventional scale consisting of seven samples of solvent under various conditions. To sample 1 (color 1) corresponds a solvent containing 75% of flocculated polymer, to sample No. 7 (color 7) corresponds a solvent with less than 5% of flocculated polymer: the lower values of this scale thus correspond is a solvent in bad condition, i.e. with high proportion of flocculated polymer, which thus gives rapid fouling, while the higher values give a solvent in good condition.

The drawn sample shows color grade 5 corresponding to about 25% flocculated polymer (that is, a solvent in satisfactory condition).

Inserting after the treatment with sulphuric acid under pressure and before the absorption on the solvent a packed column wherein the gas is washed with a solution of 8% of NaOH, the solvent soon takes up color grade 7 corresponding to less than 5% of already flocculated polymer (that is, it showed optimal conditions which allowed to carry on with the operation of the plant for over a year without stoppages due to polymer deposits).

We claim:

1. A process for the separation and depuration of acetylene contained in crude gases obtained from the cracking of hydrocarbons, which consists of subjecting the crude gases containing from 5 to 15% by volume of acetylene to a prewashing at a substantially atmospheric pressure, at 25 to 40° C., with aqueous $H_2SO_4$ having a concentration at the input of 70 to 90% and coming from a subsequent washing of the gases under pressure; subjecting the pre-washed gases, after a preliminary neutralization, to a washing at a temperature comprised between 25 and 40° C. with aqueous $H_2SO_4$ having at the input a concentration comprised between 90 and 98% at such pressure that the partial pressure of the acetylene is comprised between 0.5 and 1.4 atm. and corresponding to a total pressure from 2 to 24 atm., and treating the so depurated gases to an alkaline washing with a dilute solution of inorganic or organic bases before subjecting the gases to absorption on selective solvent.

2. The process defined in claim 1 wherein the gases subjected to a washing with sulphuric acid at a concentration of 90 to 98% are compressed to an acetylene partial pressure of substantially 0.8 to 1.2 atm.

3. A process for the depuration of acetylene contained in crude acetylene-containing gas obtained from the cracking of hydrocarbons, and having 5 to 15% by volume acetylene which consists in washing the crude gas with sulphuric acid having a concentration between 70 and 98%, at a temperature between 25 and 40° C. under a pressure such that the partial pressure of the acetylene is between 0.5 and 1.4 atm., the sulphuric acid, which comes from the washing of the gas under pressure, being used for prewashing the crude gas at substantially atmospheric pressure and a temperature of 25 to 40° C.

4. The process defined in claim 3 wherein the partial pressure of the acetylene is comprised between 0.8 and 1.2 atm. and corresponds to a total pressure comprised between 5 and 24 atm.

5. The process defined in claim 3 wherein the crude gas after washing with sulphuric acid under pressure is washed with a dilute alkaline solution.

References Cited

FOREIGN PATENTS 857,932   1/1961   Great Britain.

DELBERT E. GANTZ, *Primary Examiner.*

J. D. MYERS, *Assistant Examiner.*